United States Patent
Raghavan et al.

(10) Patent No.: US 12,469,064 B2
(45) Date of Patent: Nov. 11, 2025

(54) METHODS, SYSTEMS, AND ELECTRONIC DEVICES FOR PRESENTING SHOPPING COMPLETION TIMES IN ELECTRONIC SHOPPING INTERACTIVE COMPUTING ENVIRONS

(71) Applicant: Motorola Mobility LLC, Chicago, IL (US)

(72) Inventors: Krishnan Raghavan, Bangalore (IN); Vignesh Karthik Mohan, Bangalore (IN); Nakul Patel, Nagpur (IN)

(73) Assignee: Motorola Mobility LLC, Chicago, IL (US)

( * ) Notice: Subject to any disclaimer, the term of this patent is extended or adjusted under 35 U.S.C. 154(b) by 138 days.

(21) Appl. No.: 18/411,636

(22) Filed: Jan. 12, 2024

(65) Prior Publication Data
US 2025/0232349 A1    Jul. 17, 2025

(51) Int. Cl.
*G06Q 30/00* (2023.01)
*G06Q 30/0201* (2023.01)
*G06Q 30/0601* (2023.01)

(52) U.S. Cl.
CPC ..... *G06Q 30/0625* (2013.01); *G06Q 30/0201* (2013.01); *G06Q 30/0641* (2013.01)

(58) Field of Classification Search
CPC .................................. G06Q 30/0625
See application file for complete search history.

(56) References Cited

U.S. PATENT DOCUMENTS

| | | | | |
|---|---|---|---|---|
| 10,963,893 | B1* | 3/2021 | Sharma | G06F 18/256 |
| 2012/0019393 | A1* | 1/2012 | Wolinsky | G06Q 30/02 |
| | | | | 340/686.1 |
| 2018/0336619 | A1* | 11/2018 | Bhandari | G06Q 30/0631 |
| 2020/0126099 | A1* | 4/2020 | Deng | G06Q 30/0202 |

OTHER PUBLICATIONS

Li, Xi, et al. "How does shopping duration evolve and influence buying behavior? The role of marketing and shopping environment." Journal of Retailing and Consumer Services 62 (2021): 102607.*

"Countdown Timer", Instapage Marketing Dictionary; Unknown exact publication date but prior to filing of present application; https://instapage.com/marketing-dictionary/countdown-timer/#:~:text=A%20countdown%20timer%20is%20a,of%20an%20event%20or%20offe, Aug. 9, 2024.

"Manage your time in apps", Google Support; Unknown exact publication date but prior to filing of present application; Viewed online at https://support.google.com/android/answer/9346420?hl=en#zippy=%2Cfind-out-how-much-time-you-spend-in-apps Aug. 9, 2024.

Hotjar Team, , "What is website conversion? (And why it's all about your users)", Published Nov. 18, 2023; Viewed online at https://www.hotjar.com/blog/website-conversion/.

* cited by examiner

*Primary Examiner* — Kathleen Palavecino
(74) *Attorney, Agent, or Firm* — Philip H. Burrus, IV

(57) ABSTRACT

An electronic device includes a user interface, a memory, and one or more processors operable with the user interface and the memory. In response to the one or more processors detecting commencement of an interactive shopping session in an electronic shopping application operating on the one or more processors, the one or more processors retrieve an average electronic shopping completion time associated with a detected search string category and present a prompt identifying the average electronic shopping completion time (Continued)

associated with the detected search string category on the user interface.

20 Claims, 10 Drawing Sheets

METHODS, SYSTEMS, AND ELECTRONIC DEVICES FOR PRESENTING SHOPPING COMPLETION TIMES IN ELECTRONIC SHOPPING INTERACTIVE COMPUTING ENVIRONS

BACKGROUND

Technical Field

This disclosure relates generally to electronic devices, and more particularly to electronic devices having user interfaces.

Background Art

Portable electronic devices, such as smartphones and tablet computers, are now the primary electronic tools with which people communicate, engage in commerce, maintain calendars and itineraries, monitor health, capture images and video, and surf the Internet. In many instances, a person is more likely to carry a smartphone than a watch or wallet. Indeed, with the advent of personal finance, banking, and shopping applications many people can transact personal business solely using a smartphone and without the need for cash or a physical credit card. When used in conjunction with e-commerce sites, such devices make it incredibly simple to purchase goods and services with just a click or two.

While such technology is incredibly convenient, the ease with which modern electronic devices can engage in electronic commerce transactions can cause unintended issues for a user. It would be advantageous to have improved devices and systems to address such unintended issues.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
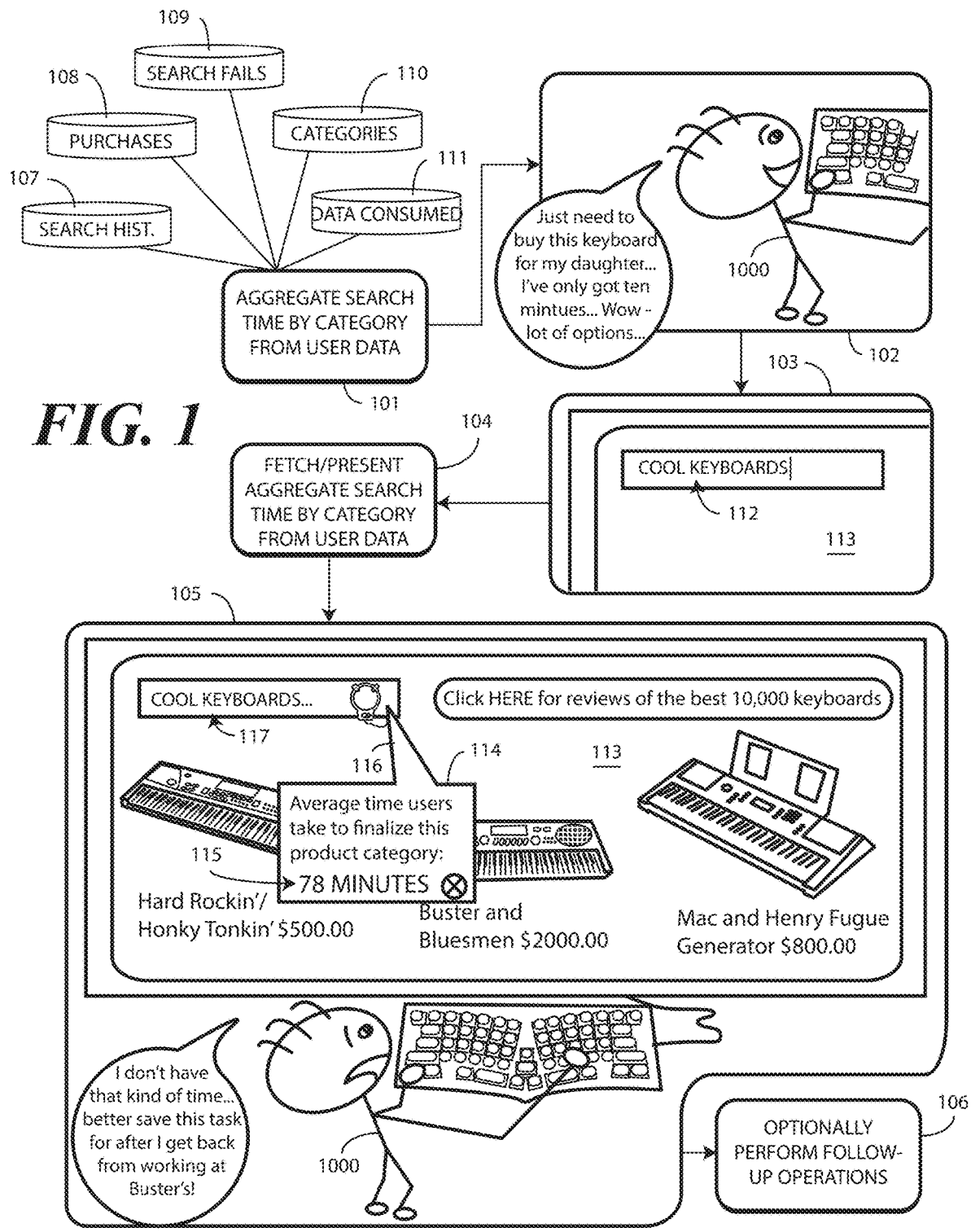
FIG. 1 illustrates one explanatory method in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to, in response to initiation of an interactive session of an electronic shopping interactive computing environment operating on one or more processors of an electronic device, detecting, by a user interface operable with the one or more processors, user input defining a search string having a category associated therewith, retrieving, by the one or more processors in response to the user input, an average electronic shopping completion time associated with the category and presenting, by the one or more processors on the user interface, a prompt identifying the average electronic shopping completion time associated with the category. Any process descriptions or blocks in flow charts should be understood as representing modules, segments, or portions of code which include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of, in response to one or more processors of an electronic device detecting commencement of an interactive shopping session in an electronic shopping application operating on the one or more processors, retrieving an average electronic shopping completion time associated with a detects search string category and presenting a prompt identifying the average electronic shopping completion time associated with the detected search string category on the user interface as described herein. The non-processor circuits may include, but are not limited to, a radio receiver, a radio transmitter, signal drivers, clock circuits, power source circuits, and user input devices.

As such, these functions may be interpreted as steps of a method to perform the retrieval of an average electronic shopping completion time associated with a detected category from an entered search string (or by clicking on a recommended product, clicking on a review, or by other user interaction events) in response to initiation of an interactive session of an electronic shopping interactive computing environment operating on one or more processors of an electronic device and presenting a prompt identifying the average electronic shopping completion time associated with the detected category. In one or more embodiments, the prompt comprises a user actuation target allowing a timer to be initiated to count down the average electronic shopping completion time associated with the detected category.

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially," "essentially," "approximately," "about," or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

New electronic shopping interactive computing environments are popping up everywhere. Illustrating by example, "Hello Shopping" is a new online marketplace service offered by Motorola Mobility intended to empower its customers to be able to purchase anything they desire, from fashion to appliances, and home décor to books, with those items being curated by reliable brands and partners at great prices. This service is now being rolled out in Brazil but is expected to incrementally launch in other regions as well. Consumer adoption of these electronic shopping interactive computing environments is growing at a phenomenal pace. This is especially true after the Sars-Cov-2 pandemic.

Embodiments of the disclosure contemplate that users spend considerable amounts of time using electronic shopping interactive computing environments. Indeed, session lengths of shopping interactions in electronic shopping interactive computing environments have increased nearly twenty percent in the last two years.

Embodiments of the disclosure also contemplate that users frequently spend far more time than actually required to complete a shopping experience in an electronic shopping interactive computing environment due to distractions and other "attractions" offered by the electronic shopping interactive computing environment. Not dissimilar from casinos without windows, users often lose track of time when engaged in an electronic shopping interactive computing environment and spend far more time looking for a product or service than expected. While this is useful for purveyors of the electronic shopping interactive computing environment, in that they are able to show shoppers more wares, it can sometimes not be the best use of time for the shopper.

Indeed, gullible users sometimes are lured deep into the depths of the electronic shopping interactive computing environment by recommendations and specials, sometimes forgetting their personal schedules and even losing track of time. It would not be unfair to say that this problem exists in the real world as well. However, in the real-world people have physical escape routes. Illustrating by example, they may simply get tired, or a physical store may have a fixed closing time before which all transactions must be completed.

Electronic shopping interactive computing environments have no such guardrails. People can shop for hours on end with no limitations. While this ability to shop all day can be convenient for consumers, it can also backfire for businesses. This is especially true when the shopper loses track of time, realizes that they are late for another appointment, and fails to complete an originally intended purchase due to overwhelming distractions or choices.

One particular problem that this phenomenon can lead to is making users hesitant to even use online marketplaces to make purchases in the first place. As some shoppers know that they have a tendency to spend too much time making purchases, they may actually postpone or avoid making purchases due to the unknown amount of time it can take for them to make a purchase.

Figure 10:
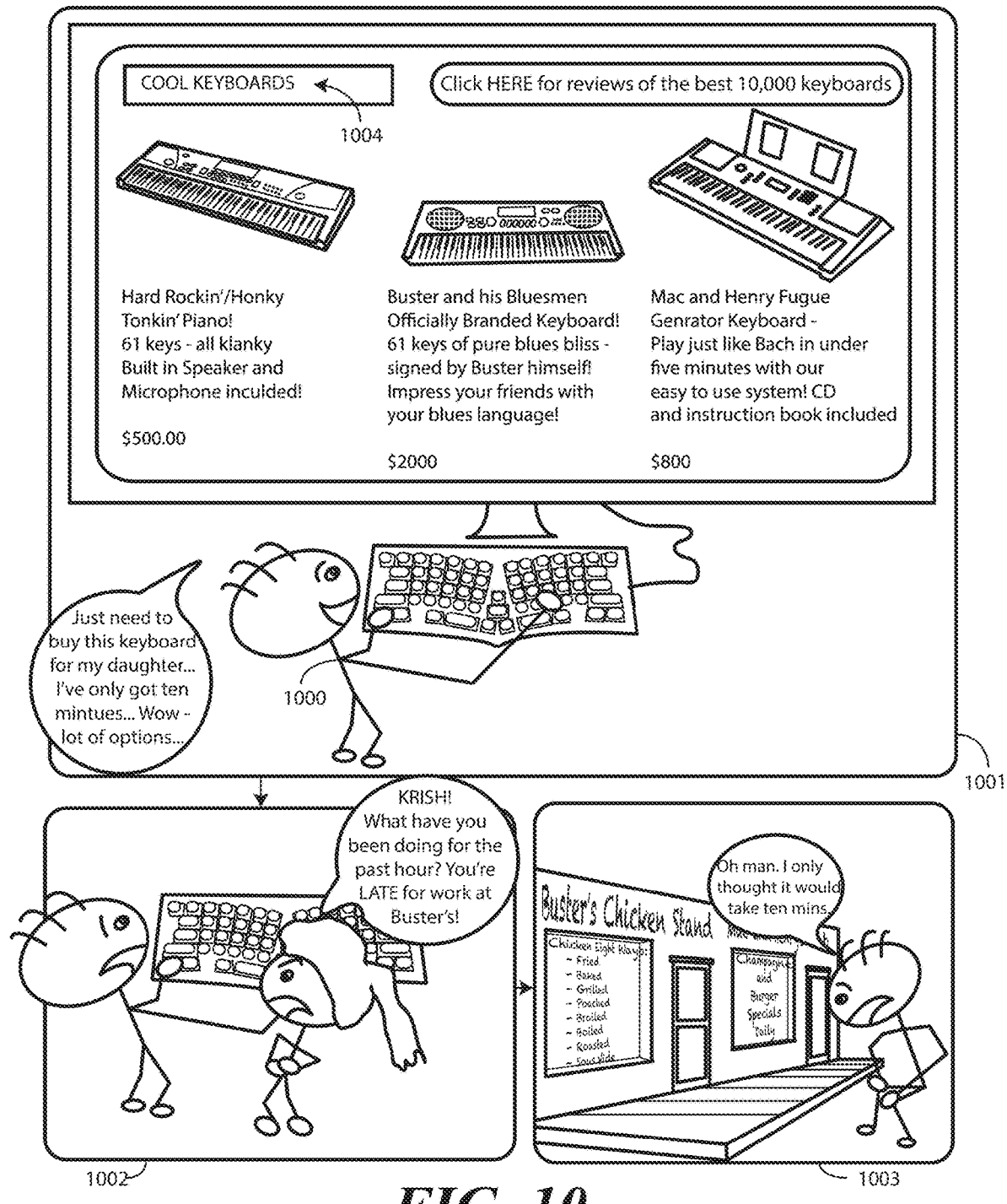
FIG. 10 illustrates a prior art method.

To illustrate by example, turn now to FIG. 10. At step 1001, our shopper 1000, Krish, has a busy day at work and needs to leave for work within the next ten minutes. At the same time, he is reminded of a promise he made to his daughter to order a musical keyboard. Thus, he commences an interactive session in an electronic shopping interactive computing environment to find just the right keyboard.

Initially thinking that there is no way that the process of selecting a keyboard can take more than ten minutes, Krish is in for a surprise. Once engaged in the electronic shopping interactive computing environment, Krish is bombarded with a plethora of options from which to choose. Just as initial options presented in response to Krish's search string

1004 for "cool keyboards," Krish is presented with a "Hard Rockin"/Honkey Tonkin" " electric piano, a Buster and His Bluesmen officially branded keyboard, and a Mac and Henry Fugue Generator keyboard. Each keyboard has recommendations, reviews, different prices, different numbers of keys, different features, and different capabilities. The "Hard Rockin'/Honkey Tonkin'" has "klanky" barroom sounds with built in speakers and a microphone. The Buster and His Bluesmen officially branded keyboard is designed for "blues bliss" and is signed by Buster himself. The Mac and Henry Fugue Generator promises to teach one to "play like Bach" in under five minutes and includes a compact disk and instruction booklet for the process.

Understandably, Krish gets engrossed in the reviews, ratings, features, and myriad of options and quickly loses track of time. Moreover, he wants to check out what others who viewed these items also viewed, as well as alternatives at each price point. Despite thinking he can purchase a keyboard in only a few minutes, he instantly becomes distracted and clicks on link after link after link. Before he knows it, he spends over two whole hours investigating keyboards, not wanting to disappoint his daughter with an inferior set of keys.

At step 1002, his wife comes in and begins to scold Krish and scold him well. She tells him that he's been there for hours and better have purchased a keyboard, as he's now so late for work that he faces reprimand. Of course, he has purchased no keyboard and instead has wasted the better part of the day. At step 1003, downtrodden and feeling low, he heads to work many hours late.

Poor Krish. However, he is not alone. Consider Vignesh, who wants to purchase a "do it yourself" oil painting kit for his family to take on as a project. To do so, he finishes lunch early by fifteen minutes, leaving him fifteen minutes until the next meeting. However, he's unsure he will be able to satisfactorily make the purchase within fifteen minutes. This uncertainty causes Vignesh to postpone the purchase. Sadly, it seems Vignesh just always has something on his to-do list. Every time he remembers the "do it yourself" oil painting kit, he seems to have an upcoming task. This just seems to leave the "do it yourself" oil painting kit as something that will just never be purchased because Vignesh is just too hesitant to enter the rabbit hole of the electronic shopping interactive computing environment, and is instead considering purchasing the same offline.

Advantageously, embodiments of the disclosure provide a solution to these problems. Embodiments of the disclosure guide users toward a more predictable shopping experience with reference to the amount of time spent to purchase a product.

In one or more embodiments, one or more processors of an electronic device gather the amount of time spent for each user browsing through and finalizing the purchase of a particular product of category. In one or more embodiments, this information is then transferred to the cloud. In one or more embodiments, the data is gathered from millions of sessions and users and is aggregated in the cloud.

Thereafter, for each search string, product type, or category, one or more processors of the electronic device retrieve average times for particular products, search strings, and/or categories. In one or more embodiments, when a user begins searching for a particular product or otherwise defines a search string, the one or more processors can fetch the average time to purchase and render it on the user interface of the electronic device.

In one or more embodiments, when a user expresses their intent to purchase a product in an electronic shopping interactive computing environment, such as by entering a search string, users are shown an average time taken to purchase the product by past users of the electronic shopping interactive computing environment. In one or more embodiments, this average time, referred to as an "average electronic shopping completion time," is calculated based upon how much time prior users took from "search to adding to cart to paying to finalizing the purchase of" similar products. In another embodiment, calculation of "average electronic shopping completion time" also considers user attributes like age, expertise, and so forth, for a more accurate presentation of the average time for the given user.

Embodiments of the disclosure contemplate that the provision of the average electronic shopping completion time has many benefits. These include helping users know initially the amount of time taken to purchase a product after expressing intent to purchase, such as by entering or otherwise defining a search string. Additionally, the provision of the average electronic shopping completion time adds a sense of competition or peer pressure to the user to complete the purchase faster than other users. This latter benefit helps both users and the sellers of products.

In one or more embodiments, the average electronic shopping completion time is presented in a prompt. In one or more embodiments, the prompt comprises a user actuation target allowing the user to initiate a timer to complete the purchase. In one or more embodiments, a default setting for the timer is for the average electronic shopping completion time. When the timer expires, based upon the user's preference, one of several actions can occur.

In a first scenario, the system can reset the home page of the electronic shopping interactive computing environment. In another scenario, one or more processors of the electronic device prevent access to the electronic shopping interactive computing environment for a few minutes. In still another scenario, the user can dismiss the notice that the timer has expired, thereby allowing them to continue shopping in the electronic shopping interactive computing environment. In still another scenario, one or more processors of the electronic device allow user to manually schedule/plan the purchase for a later time. Other scenarios will be obvious to those of ordinary skill in the art having the benefit of this disclosure.

In still other embodiments, the one or more processors can gather information from a user's calendar and alert the user to the fact that the user may not be able to complete the purchase due to the fact that an upcoming appointment may be commencing before the average electronic shopping completion time expires. Additionally, in one or more embodiments when a user expresses interest in purchasing a product, be it by entering a search string or otherwise, the user can submit a query to the one or more processors asking when the best time to purchase the product given the events stored in a calendaring application operating on the one or more processors. The one or more processors can then consult the calendaring application and determine when the user may have sufficient free time to make the purchase. This determination can be deduced from aggregated analytics in one or more embodiments.

In still other embodiments, in response to a user delivering user input to the user interface of an electronic shopping interactive computing environment defining a search string, embodiments of the disclosure can present product options in response that have the shortest average electronic shopping completion time. Illustrating by example, if the three keyboards presented to Krish in FIG. 10 took fifteen minutes, forty-five minutes, and two hours on average, respectively, to purchase, in one or more embodiments the electronic shopping interactive computing environment may present only keyboards that have an average electronic shopping completion time of less than thirty minutes in response to the "cool keyboards" search string. Thus, while the Hard Rockin'/Honky Tonkin' may be included, the Buster and his Bluesmen officially branded keyboard and Mac and Henry Fugue Generator may be excluded from initial search results.

In one or more embodiments, this limitation of those products falling below a predefined average electronic shopping completion time can be in response to user input or user defined limitations. The electronic shopping interactive computing environment may present a prompt noting, for example, "Really cool keyboards have an average electronic shopping completion time of one hour-how much time do you have?" If a user answers with "thirty minutes," the electronic shopping interactive computing environment may ask, "would you like your search results to be limited only to those keyboards having less than that average electronic shopping completion time? They're still pretty cool, after all," and so forth.

Embodiments of the disclosure contemplate that the average electronic shopping completion time-based presentation of products is sometimes a reflection of the quality of the product in that consumers often purchase name brand, highly rated products very quickly and directly. Accordingly, embodiments of the disclosure contemplate that the average electronic shopping completion time-based presentation of products can advantageously provide a maximum return on time invested. Other embodiments and advantages will be described below. Still others will be obvious to those of ordinary skill in the art having the benefit of this disclosure.

In one or more embodiments, a method in an electronic device comprises, in response to initiation of an interactive session in an electronic shopping interactive computing environment operating on one or more processors of the electronic device, detecting a purchase intend, such as when user interaction events define a search string having a category associated therewith. In one or more embodiments, the method retrieves, in response to the user input, an average electronic shopping completion time associated with the category. In one or more embodiments, the one or more processors present, on a user interface, a prompt identifying the average electronic shopping completion time associated with the category. In one or more embodiments, the prompt comprises a user actuation target that, when actuated initiates a timer.

In one or more embodiments, an electronic device comprises a user interface, a memory, and one or more processors operable with the user interface and the memory. In one or more embodiments, in response to the one or more processors detecting commencement of an interactive shopping session in an electronic shopping application operating on one or more processors of the electronic device, the one or more processors retrieve an average electronic shopping completion time associated with a detected search string and/or category and present a prompt identifying the average electronic shopping completion time associated with the detected search string and/or category on the user interface. In one or more embodiments, the one or more processors retrieve this average electronic shopping completion time using a communication device from a remote electronic device across a network. In one or more embodiments, the average electronic shopping completion time is a culmination of average search to purchase times of other users of the electronic shopping interactive computing environment or electronic shopping application when shopping for similar products within that detected category.

In one or more embodiments, a method in an electronic device comprises retrieving, by one or more processors using a communication device, an average electronic shopping completion time associated with a detected category from an entered search string in response to initiation of an interactive session of an electronic shopping interactive computing environment operating on one or more processors of the electronic device. In one or more embodiments, the method comprises presenting, by the one or more processors on the user interface, a prompt identifying the average electronic shopping completion time associated with the detected category. In one or more embodiments, the prompt comprises a user actuation target allowing a timer to be initiated to count down the average electronic shopping completion time associated with the detected category.

In one or more embodiments, the method further accesses calendaring data associated with a calendaring application. In one or more embodiments, the one or more processors access these data to determine whether any upcoming appointments will occur during the average electronic shopping completion time associated with the detected category. In one or more embodiments, the prompt includes a user actuation target allowing the timer to be initiated only when the calendaring data fail to indicate that any upcoming appointments will be occurring during the average electronic shopping completion time with the detected category.

To see how embodiments of the disclosure can work, turn now to FIG. 1. Beginning at step 101, one or more processors of an electronic device aggregate average electronic shopping completion times for products, categories, and search strings for users of an electronic shopping interactive computing environment. The electronic device could be a server operating within the electronic shopping interactive computing environment, a cloud server operable with the electronic shopping interactive computing environment, an electronic device operating within the electronic shopping interactive computing environment in communication with an aggregation electronic device of the electronic shopping interactive computing environment, or other electronic device.

In one or more embodiments, at step 101 the electronic device gathers the amount of time users spend browsing through and finalizing purchase of products of various types or in various categories, or that are associated with certain search strings. In one or more embodiments, step 101 transfers gathered, aggregated data from millions of sessions or users and transfers this information to the cloud.

This information can include anonymized search histories that are stored in a search history database 107, purchases made, which are stored in a purchase database 108, and searches that ended up culminating in no purchase made, which are stored in a search fail database 109. The aggregation of these data can also include the categories and/or search strings associated with each product or service, which are stored in a category database 110. Additionally, the total amount of data consumed by people searching for products and services, which is indicative of time spent, can be stored in a data consumption database 111. From these databases, an average electronic shopping completion time can be calculated for each search string to category of offering in the electronic shopping interactive computing environment.

Turning now to step 102, our shopper 1000, Krish, once again has a busy day at work and needs to leave for work within the next ten minutes. At the same time, he again is reminded of a promise he made to his daughter to order a musical keyboard. Thus, at step 102 he commences an interactive session in an electronic shopping interactive computing environment to find just the right keyboard.

Initially thinking that there is no way that the process of selecting a keyboard can take more than ten minutes, Krish is in for a surprise. Once engaged in the electronic shopping interactive computing environment, Krish defines a search string at step 103 by entering "cool keyboards" into a search bar of the electronic shopping interactive computing environment. While this is one way of defining a search string for a category of product or service, there are other ways that a user can define a search string in accordance with embodiments of the disclosure as well.

Illustrating by example, in other embodiments, they may click on a particular product. This defines a search string because the product upon which the shopper 1000 clicks has a category associated therewith. Thus, by selecting a product belonging to that category, the shopper 1000 selects the category as well.

In still other embodiments, the shopper 1000 can define a search string by clicking on a review of a particular product or service. In still other embodiments, the shopper 1000 can define a search string by clicking on a category or category definition. Other techniques for defining a search string will be obvious to those of ordinary skill in the art having the benefit of this disclosure. Thus, in one or more embodiments step 103 comprises, in response to the shopper 1000 initiating an interactive session of an electronic shopping interactive computing environment operating on one or more processors of an electronic device, detecting, by a user input at a user interface 113 of the electronic device defining a search string 112.

At step 104, one or more processors of the electronic device 100 retrieve an average electronic shopping completion time associated with the category defined by the search string 112. In one or more embodiments, a communication device of the local electronic device retrieves this average electronic shopping completion time associated with the detected search string category from a remote electronic device across a network. This remote electronic device could be a server operating within the electronic shopping interactive computing environment, a cloud server operable with the electronic shopping interactive computing environment, an electronic device operating within the electronic shopping interactive computing environment in communication with the local electronic device, or other electronic device.

At step 105, the one or more processors of the local electronic device present, on the user interface 113, a prompt 114 identifying the average electronic shopping completion time 115 associated with the category. In this illustrative embodiment, the prompt 114 includes a directional indicator 116 that identifies the detected search string category 117. In this illustrative embodiment, the directional indicator 116 is a triangular arrowhead extending distally from a boundary of the prompt 114. This example of a directional indicator 116 is illustrative only, as numerous others will be obvious to those of ordinary skill in the art having the benefit of this disclosure.

The presentation of this prompt 114 identifying the average electronic shopping completion time 115 provides a couple of benefits to our shopper 1000. These benefits include helping the shopper 1000 know initially the amount of time taken to purchase a cool keyboard. Additionally, if the shopper 1000 attempts to continue with the purchase, the presentation of the average electronic shopping completion time 115 can beneficially add a sense of competition or peer pressure encouraging the shopper 1000 to complete the purchase faster than other users.

In this illustrative example, the former is the primary benefit, in that Krish immediately realizes that he will not have time to complete this purchase before he is due to work. However, Krish is immediately notified of this fact, rather than having to be bombarded with a plethora of options from which to choose, reviews, comparable products, and so forth. This allows Krish to not only get to work on time and not risk reprimand, but he also avoids his wife scolding him as well, which is a real win-win.

Figure 3:
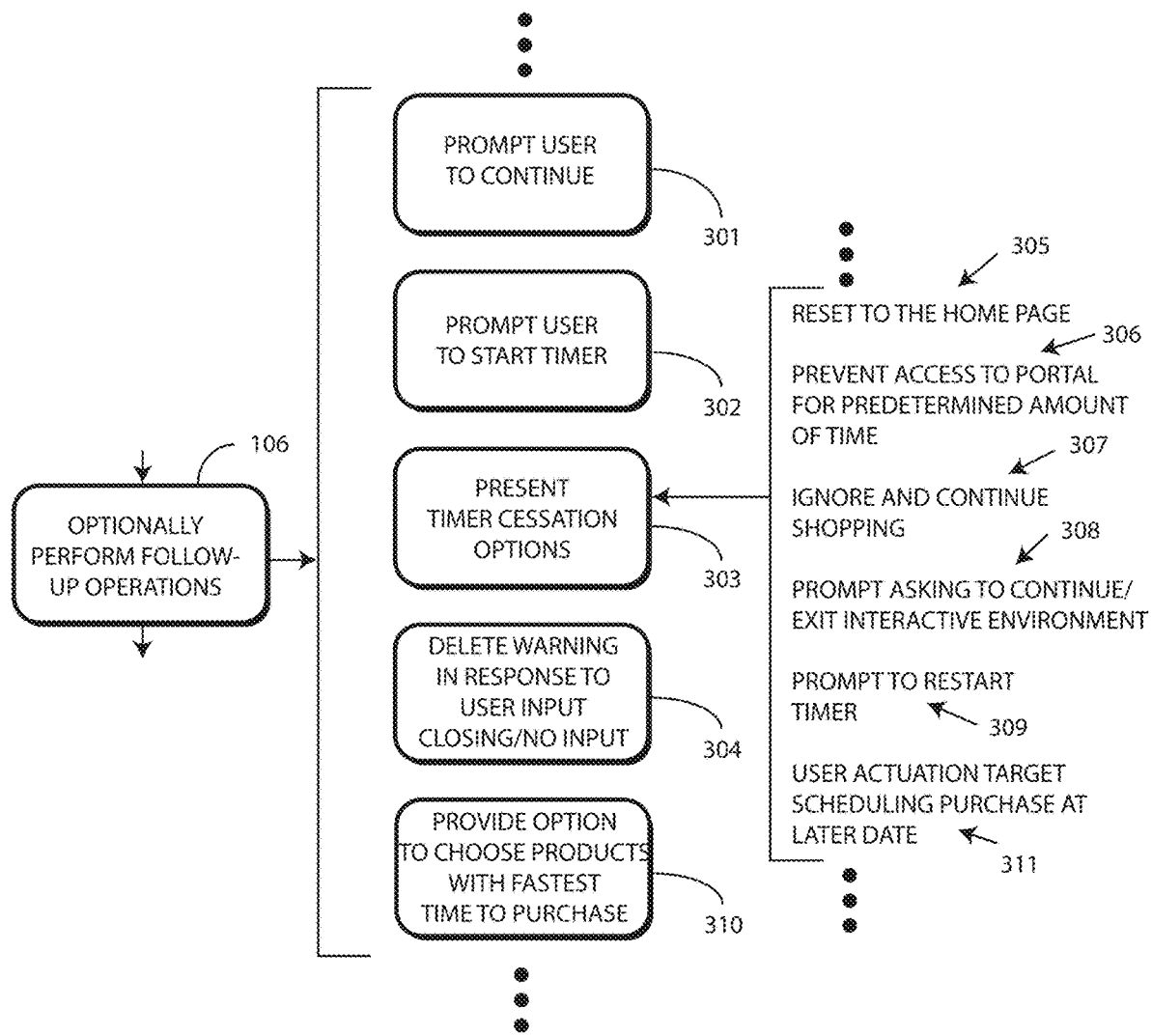
FIG. 3 illustrates one or more method steps in accordance with one or more embodiments of the disclosure.

At step 106, additional operations, sometimes referred to as "follow-up" operations, can be performed. Turning briefly now to FIG. 3, illustrated therein are some examples of other operations that can be performed at step 106. Others will be obvious to those of ordinary skill in the art having the benefit of this disclosure.

In one or more embodiments, at step 301, the prompt that is presented to identify the average electronic shopping completion time also comprises a query asking the shopper whether they would like to continue in view of the average electronic shopping completion time. At step 301, the prompt can include a user actuation target that, when actuated, allows the interactive shopping session to continue and optionally, for the prompt to be removed.

In one or more embodiments, at step 302, the prompt presented that identifies the average electronic shopping completion time comprises a user actuation target that, when actuated, causes the one or more processors to start a timer. In one or more embodiments, the timer is set for the average electronic shopping completion time as a default. Thus, in such a scenario actuation of the user actuation target would cause the one or more processors to initiate the timer to count down the average electronic shopping completion time associated with the category.

However, in other embodiments, such as when the electronic shopping interactive computing environment queries the shopper regarding how much time they have to make a purchase, the timer is set to that amount of time. In still other embodiments, the amount of time for which the timer is set is user-defined.

Step 303 illustrates options for when the timer of step 302 expires. In a simple embodiment, the one or more processors reset the electronic shopping interactive computing environment.

In one or more embodiments, upon expiration of the timer the one or more processors present another prompt at step 302. Illustrating by example, in one or more embodiments the new prompt comprises a timer restart user actuation target 309 that, when actuated, restarts the timer. In other embodiments, the prompt comprises a query 308 asking the shopper whether they would like to continue shopping or exit the electronic shopping interactive computing environment. Where this query is present, the prompt can comprise a continue user actuation target that, when actuated, extends the interactive session in the electronic shopping interactive computing environment.

In still other embodiments, the prompt comprises an exit user actuation target 305 that, when executed, terminates the interactive session in the electronic shopping interactive computing environment. Illustrating by example, in one or more embodiments the exit user actuation target 305 allows the shopper to reset the home page.

In still other embodiments, the prompt comprises a user actuation target 306 that prevents access to the electronic shopping interactive computing environment for a predefined amount of time. Of course, the prompt can include a user actuation target 307 allowing the user to dismiss the prompt and keep shopping as well. When this user actuation target is actuated, step 304 can comprise the one or more processors removing the prompt from the user interface after this user actuation target 307 is actuated. In other embodiments, step 304 comprises the one or more processors removing the prompt from the user interface upon detecting an absence of user interaction with the prompt for a predefined duration. In still other embodiment, the prompt comprises another user actuation target 311 that, when executed, schedules the purchase for a later time based on user input or availability determined from a calendaring application and terminates the interactive session in the electronic shopping interactive computing environment.

Another example of another operation that can be performed at step 106 occurs at step 310. At step 310, in response to a user delivering user input to the user interface of an electronic shopping interactive computing environment defining a search string, embodiments of the disclosure can present options in response that have the shortest average electronic shopping completion time. In one or more embodiments, this limitation of those products falling below a predefined average electronic shopping completion time at step 310 can be in response to user input or user defined limitations.

Embodiments of the disclosure contemplate that the average electronic shopping completion time-based presentation of products at step 310 is sometimes a reflection of the quality of the product in that consumers often purchase name brand, highly rated products very quickly and directly. Accordingly, embodiments of the disclosure contemplate that the average electronic shopping completion time-based presentation of products at step 310 can advantageously provide a maximum return on time invested.

Figure 2:
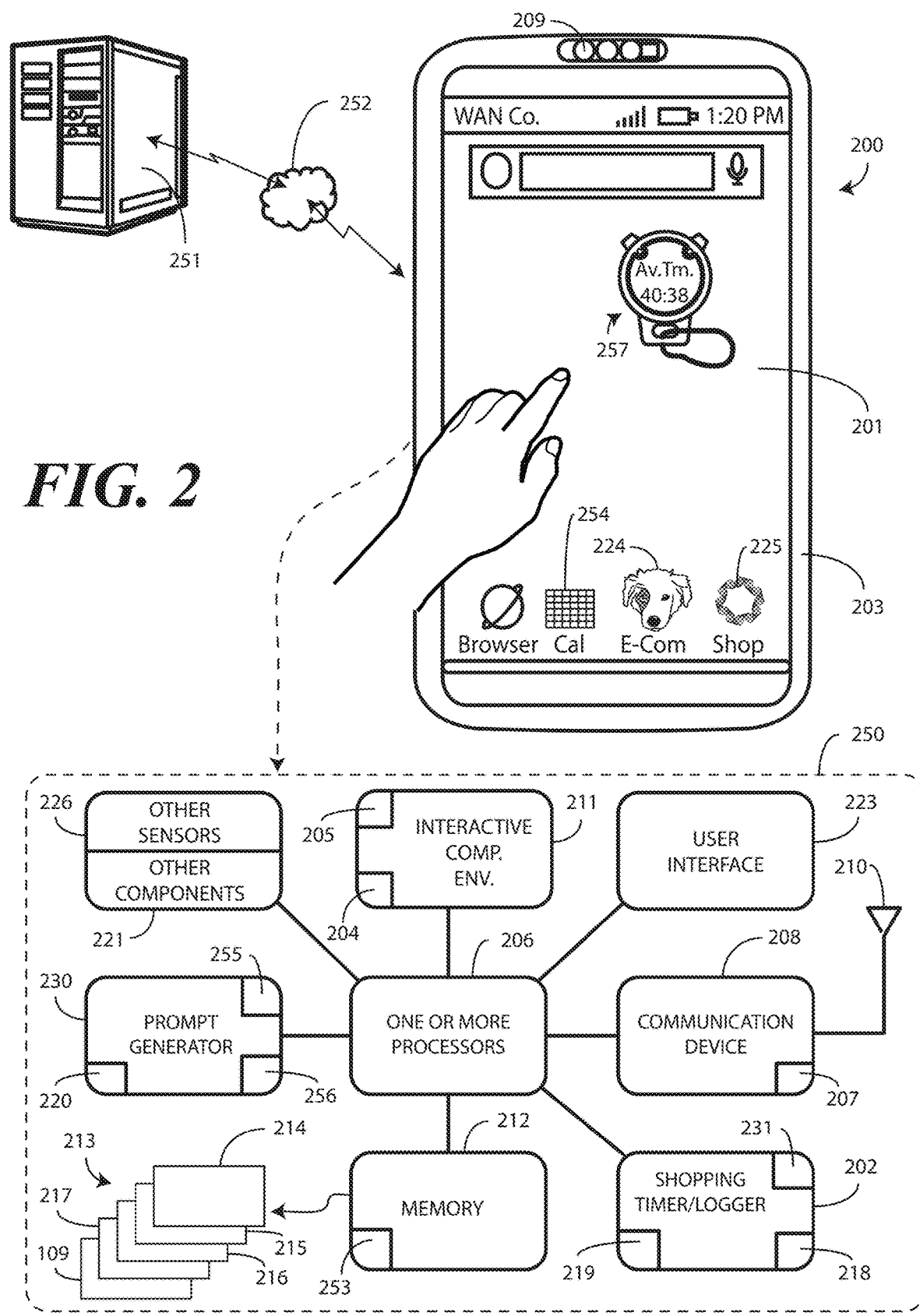
FIG. 2 illustrates one explanatory electronic device in accordance with one or more embodiments of the disclosure.

Turning now to FIG. 2, illustrated therein is one electronic device 200 configured in accordance with one or more embodiments of the disclosure. The electronic device 200 of this illustrative embodiment includes a user interface 223. In one or more embodiments, the user interface 223 comprises a display 201, which may optionally be touch-sensitive. The display 201 can serve as a primary user interface 223 of the electronic device 200.

Where the display 201 is touch sensitive, users can deliver user input to the display 201 by delivering touch input from a finger, stylus, or other objects disposed proximately with the display. In one embodiment, the display 201 is configured as an active-matrix organic light emitting diode (AMOLED) display. However, it should be noted that other types of displays, including liquid crystal displays, would be obvious to those of ordinary skill in the art having the benefit of this disclosure.

The explanatory electronic device 200 of FIG. 2 includes a housing 203. Features can be incorporated into the housing 203. Examples of features that can be included along the housing 203 include an imager 209, shown as a camera in FIG. 2, or an optional speaker port. A user interface component, which may be a button or touch sensitive surface, can also be disposed along the housing 203.

A block diagram schematic 250 of the electronic device 200 is also shown in FIG. 2. In one embodiment, the electronic device 200 includes one or more processors 206. In one embodiment, the one or more processors 206 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more Application Specific Integrated Circuits (ASICs), programmable logic, or other type of processing device.

The application processor and the auxiliary processor(s) can be operable with the various components of the electronic device 200. Each of the application processor and the auxiliary processor(s) can be configured to process and execute executable software code to perform the various functions of the electronic device 200. A storage device, such as memory 212, can optionally store the executable software code used by the one or more processors 206 during operation.

In this illustrative embodiment, the electronic device 200 also includes a communication device 208 that can be configured for wired or wireless communication with one or more other devices or networks. The networks can include a wide area network, a local area network, and/or personal area network. The communication device 208 may also utilize wireless technology for communication, such as, but are not limited to, peer-to-peer, or ad hoc communications such as HomeRF, Bluetooth and IEEE 802.11 based communication, or alternatively via other forms of wireless communication such as infrared technology. The communication device 208 can include wireless communication circuitry, one of a receiver, a transmitter, or transceiver, and one or more antennas 210.

The electronic device 200 can optionally include a near field communication circuit 207 used to exchange data, power, and electrical signals between the electronic device 200 and another electronic device. In one embodiment, the near field communication circuit 207 is operable with a wireless near field communication transceiver, which is a form of radio-frequency device configured to send and receive radio-frequency data to and from the companion electronic device or other near field communication objects.

Where included, the near field communication circuit 207 can have its own near field communication circuit controller in one or more embodiments to wirelessly communicate with companion electronic devices using various near field communication technologies and protocols. The near field communication circuit 207 can include—as an antenna—a communication coil that is configured for near-field communication at a particular communication frequency. The term "near-field" as used herein refers generally to a distance of less than about a meter or so. The communication coil communicates by way of a magnetic field emanating from the communication coil when a current is applied to the coil. A communication oscillator applies a current waveform to the coil. The near field communication circuit controller may further modulate the resulting current to transmit and receive data, power, or other communication signals with companion electronic devices.

In one embodiment, the one or more processors 206 can be responsible for performing the primary functions of the electronic device 200. For example, in one embodiment the one or more processors 206 comprise one or more circuits operable to present presentation information, such as images, text, and video, on the display 201. When an electronic shopping application 225 is actuated, the one or more processors 206 can present an electronic shopping interactive computing environment to a user on the display 201, within which the user can make user interaction events. The executable software code used by the one or more processors 206 can be configured as one or more modules 213 that are operable with the one or more processors 206. Such modules 213 can store instructions, control algorithms, and so forth.

In one embodiment, the one or more processors 206 are responsible for running the operating system environment 214. The operating system environment 214 can include a kernel, one or more drivers, and an application service layer 215, and an application layer 216. The operating system environment 214 can be configured as executable code operating on one or more processors or control circuits of the electronic device 200.

The application service layer 215 can be responsible for executing application service modules. The application service modules may support one or more applications 217 or "apps." Examples of such applications include a cellular telephone application for making voice telephone calls, a web browsing application configured to allow the user to view webpages on the display 201 of the electronic device 200, an electronic mail application configured to send and receive electronic mail, a photo application configured to organize, manage, and present photographs on the display 201 of the electronic device 200, and a camera application for capturing images with the imager 209. Collectively, these applications constitute an "application suite." In one or more embodiments, these applications comprise one or more e-commerce applications 224 and/or electronic shopping applications 225 that allow electronic commerce orders to be placed and financial transactions to be made using the electronic device 200.

Illustrating by example, in one or more embodiments a user can deliver user input to an e-commerce application 224 to launch an interactive session 204 of an electronic shopping interactive computing environment 211 that operates on the one or more processors 206. They can then deliver user input to the user interface 223 to define one or more search strings corresponding to one or more categories within the electronic shopping interactive computing environment 211. The one or more processors 206 can then monitor user interaction events in the electronic shopping interactive computing environment 211 to determine whether the category associated with the search string changes.

The one or more processors 206 can use a shopping timer/logger 202 to, in response to detecting commencement of an interactive shopping session in an electronic shopping application operating on the one or more processors 206, retrieving, using the communication device 208, operationally from a remote electronic device 251 across a network 252, an average electronic shopping completion time 218 associated with a detected search string category 219. In one or more embodiments, the one or more processors 206 then present a prompt 220 generated by a prompt generator 230 identifying the average electronic shopping completion time 218 associated with the detected search string category 219 on the user interface 223 of the electronic device 200.

In one or more embodiments, the one or more processors 206 can further access calendaring data 253 associated with a calendaring application 254 stored in the memory 212 of the electronic device to determine whether any upcoming appointments will occur during the average electronic shopping completion time 218 associated with the detected category 219. In one or more embodiments, when at least one upcoming appointment will occur during the average electronic shopping completion time 218 associated with the detected search string category 219, the one or more processors 206 can cause the user interface 223 to present a conflict prompt 255 generated by the prompt generator 230. In one or more embodiments, the conflict prompt 255 indicates that there is less than the average electronic shopping completion time 218 associated with the detected search string category 219 until the at least one upcoming appointment occurs. This notifies the shopper that they likely will not have time to complete their purchased based upon the average times past purchasers took to make the same purchase.

The one or more processors 206 can access the calendaring data 253 for other reasons as well. In one or more embodiments, the one or more processors 206 access the calendaring data 253 to identify a period spanning the average electronic shopping completion time 218 associated with the detected search string category 219 that is devoid of appointments. In one or more embodiments, the one or more processors 206 present a proposed scheduling prompt 256 allowing the interactive shopping session to be added to the calendaring data 253 as a new upcoming event. This advantageously allows the user of the electronic device 200 to automatically schedule an amount of time greater than or equal to the average electronic shopping completion time 218 associated with the detected search string category 219 as a meeting so that the desired item can be purchased.

In one or more embodiments, this presentation of the prompt 220 identifying the average electronic shopping completion time 218 associated with the detected search string category 219 is retrieved and presented in response to user input defining the search string having the category associated therewith in the interactive session 204 of the electronic shopping interactive computing environment 205. When the category associated with the search string changes to another category associated with another search string, the one or more processors 206 repeat the process. This process can continue for each category and/or search string.

In one or more embodiments, in response to the one or more processors 206 detecting commencement of the interactive session 204, which in the electronic shopping application 225 is an interactive shopping session, the one or more processors 206 cause the shopping timer/logger 202 to initiate a timer 231 in response to the actuation of a user actuation target included in the prompt 220. In response to the interactive shopping session ceasing, the one or more processors 206 cause the shopping timer/logger 202 to present the compilation of timer data for the interactive shopping session on the user interface 223. In one or more embodiments, the compilation of timer data itemizes each search string category and a corresponding amount of time associated with each search string category.

In one or more embodiments, the one or more processors 206 are responsible for managing the applications and all personal information received from the user interface 223 that is to be used by the e-commerce application 224 and/or electronic shopping application 225 after the electronic device 200 is authenticated as a secure electronic device and the user identification credentials have triggered an electronic payment transaction request to complete an electronic shopping cart interaction event. The one or more processors 206 can also be responsible for launching, monitoring, and killing the various applications and the various application service modules. In one or more embodiments, the one or more processors 206 are operable to not only kill the applications, but also to expunge any and all personal data, data, files, settings, or other configuration tools when the electronic device 200 is reported stolen or when the e-commerce application 224 and/or electronic shopping application 225 are used with fraudulent activity to wipe the memory 212 clean of any personal data, preferences, or settings of the person previously using the electronic device 200.

The one or more processors 206 can also be operable with other components 221. The other components 221, in one embodiment, include input components, which can include acoustic detectors as one or more microphones. The one or more processors 206 may process information from the other components 221 alone or in combination with other data, such as the information stored in the memory 212 or information received from the user interface.

The other components 221 can include a video input component such as an optical sensor, another audio input component such as a second microphone, and a mechanical input component such as button. The other components 221 can include one or more sensors 226, which may include key selection sensors, touch pad sensors, capacitive sensors, motion sensors, and switches. Similarly, the other components 221 can include video, audio, and/or mechanical outputs.

The one or more sensors 226 may include, but are not limited to, accelerometers, touch sensors, surface/housing capacitive sensors, audio sensors, and video sensors. Touch sensors may be used to indicate whether the electronic device 200 is being touched at side edges. The other components 221 of the electronic device can also include a device interface to provide a direct connection to auxiliary components or accessories for additional or enhanced functionality and a power source, such as a portable battery, for providing power to the other internal components and allow portability of the electronic device 200.

In one or more embodiments, the electronic device 200 comprises a prompt generator 230 as well. In one or more embodiments, the prompt generator generates a prompt 220 identifying the average electronic shopping completion time 218 retrieved from the remote electronic device 251 across the network 252. When a timer is initiated in response to user actuation of a user actuation target presented in the prompt, a graphical representation 257, one example of which is a stoptwatch graphical representation, can be presented on the user interface 223.

In one or more embodiments, the shopping timer/logger 202 and the prompt generator 230 can be operable with one or more processors 206, configured as a component of the one or more processors 206, or configured as one or more executable code modules operating on the one or more processors 206. In other embodiments, the shopping timer/logger 202 and the prompt generator 230 can be standalone hardware components operating executable code or firmware to perform their functions. Other configurations for the shopping timer/logger 202 and the prompt generator 230 will be obvious to those of ordinary skill in the art having the benefit of this disclosure.

It is to be understood that FIG. 2 is provided for illustrative purposes only and for illustrating components of one electronic device 200 in accordance with embodiments of the disclosure and is not intended to be a complete schematic diagram of the various components required for an electronic device. Therefore, other electronic devices in accordance with embodiments of the disclosure may include various other components not shown in FIG. 2 or may include a combination of two or more components or a division of a particular component into two or more separate components, and still be within the scope of the present disclosure.

Figure 4:
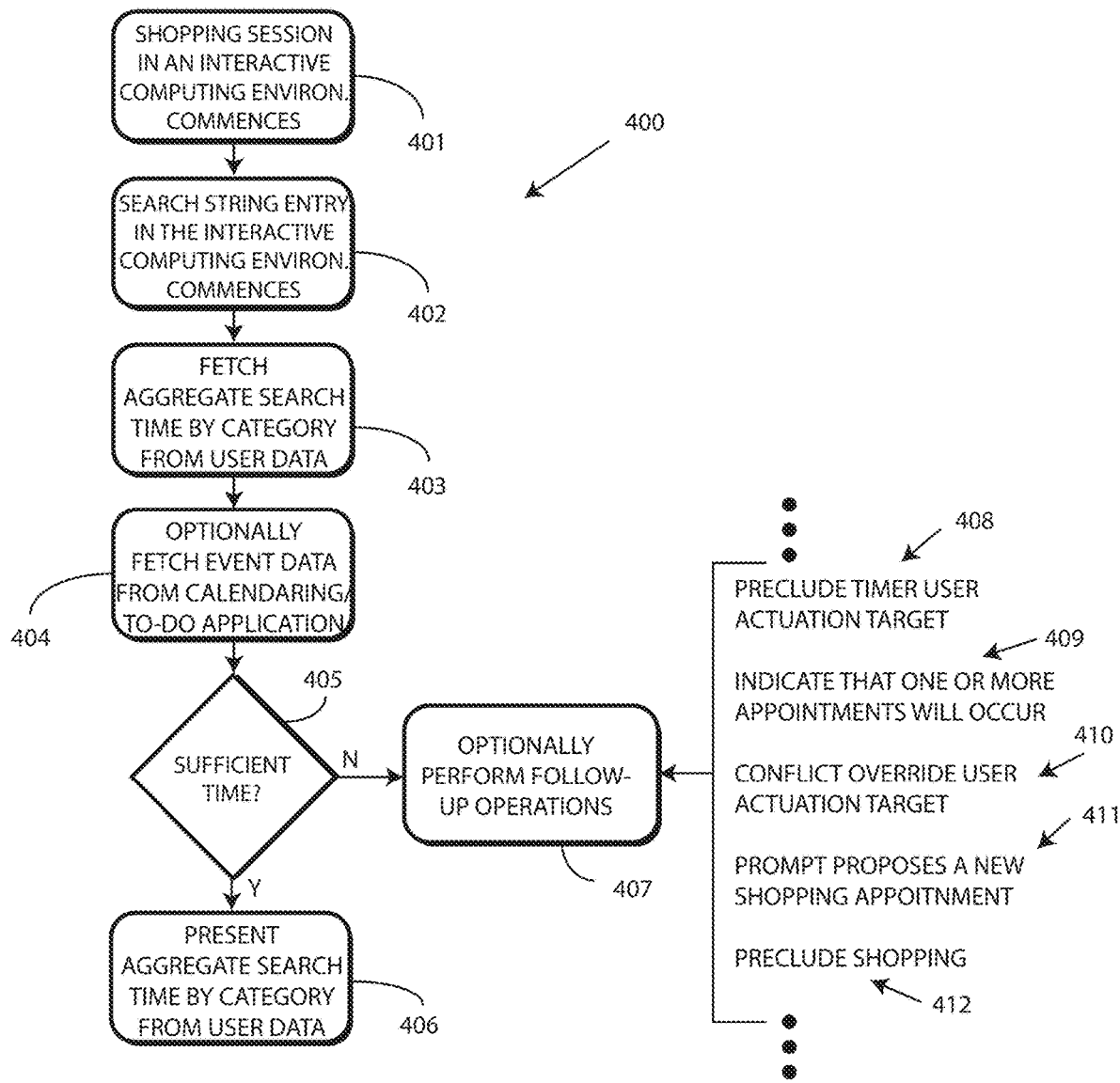
FIG. 4 illustrates one explanatory method in accordance with one or more embodiments of the disclosure.

Turning now to FIG. 4, illustrated therein is one explanatory method 400 in accordance with one or more embodiments of the disclosure. Beginning at step 401, a user delivers user input to a user interface of an electronic device to initiate an electronic shopping interactive computing environment operating on one or more processors of the electronic device. At step 402, other user input defining a search string having a category associated therewith is delivered to the user interface of the electronic device.

This user input defining the search string at step 402 can take a variety of forms. In one or more embodiments, the user simply inters search string terms into a search portal of the electronic shopping interactive computing environment. In other embodiments, however, the user defines the search string at step 402 differently.

For instance, the user may simply click on a link corresponding to a particular product, which constitutes the entry of a search string with a category associated therewith corresponding to the product. In still other embodiments, the user may click on a link corresponding to a review of a product to generate the effective search string having the category associated therewith. The user may click on links to other "related" products that the user may be interested, for example, such as clicking on a link for cheese when purchasing wine. This diversion from wine to cheese would constitute another search string having another category associated therewith. Other techniques for defining a search string having a category associated therewith at step 402 will be obvious to those of ordinary skill in the art having the benefit of this disclosure.

At step 403, one or more processors operable with a communication device use the communication device to retrieve an average electronic shopping completion time associated with the detected category from the search string defined or entered at step 402. In one or more embodiments, step 403 occurs in response to the initiation of the interactive session of the electronic shopping interactive computing environment at step 401.

At optional step 404, the one or more processors access calendaring data associated with a calendaring application. In one or more embodiments, step 404 comprises retrieving, from the calendaring application by the one or more processors, one or more upcoming appointments occurring within the average electronic shopping completion time associated with the category.

Decision 405 then determines whether any upcoming appointments will occur during the average electronic shopping completion time associated with the detected category. Where they do not, i.e., where the shopper has enough free time to complete a purchase within the average electronic shopping completion time, or where step 404 and accompanying decision 405 are omitted, step 406 comprises presenting, by the one or more processors on a user interface of the electronic device, a prompt identifying the average electronic shopping completion time associated with the detected category. As noted above, in one or more embodiments the prompt presented at step 406 can comprise a user actuation target allowing a timer to be initiated to count down the average electronic shopping completion time associated with the detected category.

By contrast, where step 404 and accompanying decision 405 are included in the method 400, and where decision 405 determines that there are one or more upcoming appointments occurring during the average electronic shopping completion time, other operations can be performed at step 407. These other operations can be any of those described above with reference to FIG. 3. However, they can take other forms as well.

Illustrating by example, in one or more embodiments the other operations performed at step 407 can comprise presenting the prompt identifying the average electronic shopping completion time, like at step 406, but precluding 408 the presentation of the prompt allowing the timer to be initiated to count town the average electronic shopping completion time associated with the detected category. Thus, in one or more embodiments the prompt presented is presented at step 404. However, in one or more embodiments the prompt includes the user actuation target allowing the timer to be initiated only when the calendaring data fail to indicate that any upcoming appointments are occurring during the average electronic shopping completion time associated with the detected category.

In other embodiments, the prompt presented at step 407, in addition to identifying the average electronic shopping completion time, can indicate 409 that one or more upcoming appointments will occur within the average electronic shopping completion time. In some embodiments, the prompt presented at step 407 can include a conflict override user actuation target 410 that, when actuated, dismisses the prompt.

In still other embodiments, the prompt presented at step 407 identifying the average electronic shopping completion time can propose, either on the prompt itself or in another prompt, a shopping appointment 411 during which the calendaring application is devoid of upcoming appointments for the average electronic shopping completion time associated with the detected category.

In still other embodiments, the method 400 can simply preclude 412 any shopping from occurring at step 407 when decision 405 determines from the calendaring data of the calendaring application that one or more upcoming appointments will occur during the average electronic shopping completion time. This option can be useful, for example, when parental controls are in place to prevent a son or daughter from shopping when they have an upcoming class or activity. Of course, as mad as Krish's wife was above in FIG. 10, she may put similar controls in place so that Krish does not get reprimanded at work for being late yet again. Other options that can be performed at step 407 will be obvious to those of ordinary skill in the art having the benefit of this disclosure.

Figure 5:
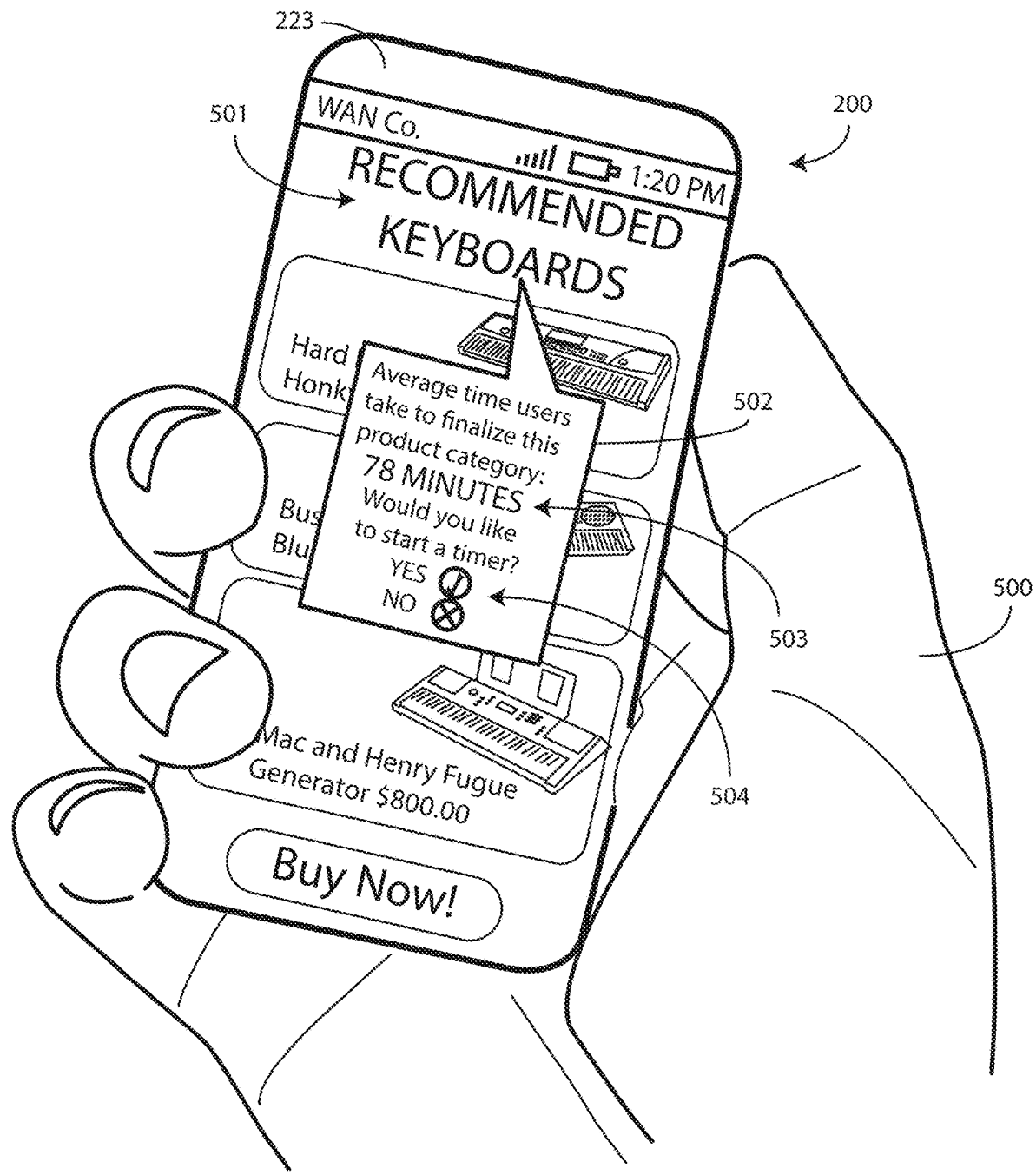
FIG. 5 illustrates one explanatory user interface presenting an electronic shopping interactive computing environment in accordance with one or more embodiments of the disclosure.

Now that methods, systems, and electronic devices in accordance with embodiments of the disclosure have been described, attention will be turned to various prompts that can be presented on a user interface of an electronic device. Turning now to FIG. 5, in response to initiation of an interactive session of an electronic shopping interactive computing environment operating on one or more processors of an electronic device 200, and further in response to user input delivered to the user interface 223 defining a search string 501 having a category associated therewith, one or more processors of the electronic device 200 cause a communication device to retrieve an average electronic shopping completion time 503 and present, on the user interface 223, a prompt 502 identifying the average electronic shopping completion time 503.

In this illustrative embodiment, the prompt 502 comprises a user actuation target 504 that, when actuated, causes the one or more processors to initiate a timer. Since the user 500 has actuated the user actuation target 504, in this illustrative embodiment the timer will count down the average electronic shopping completion time 503 associated with the detected category.

Figure 6:
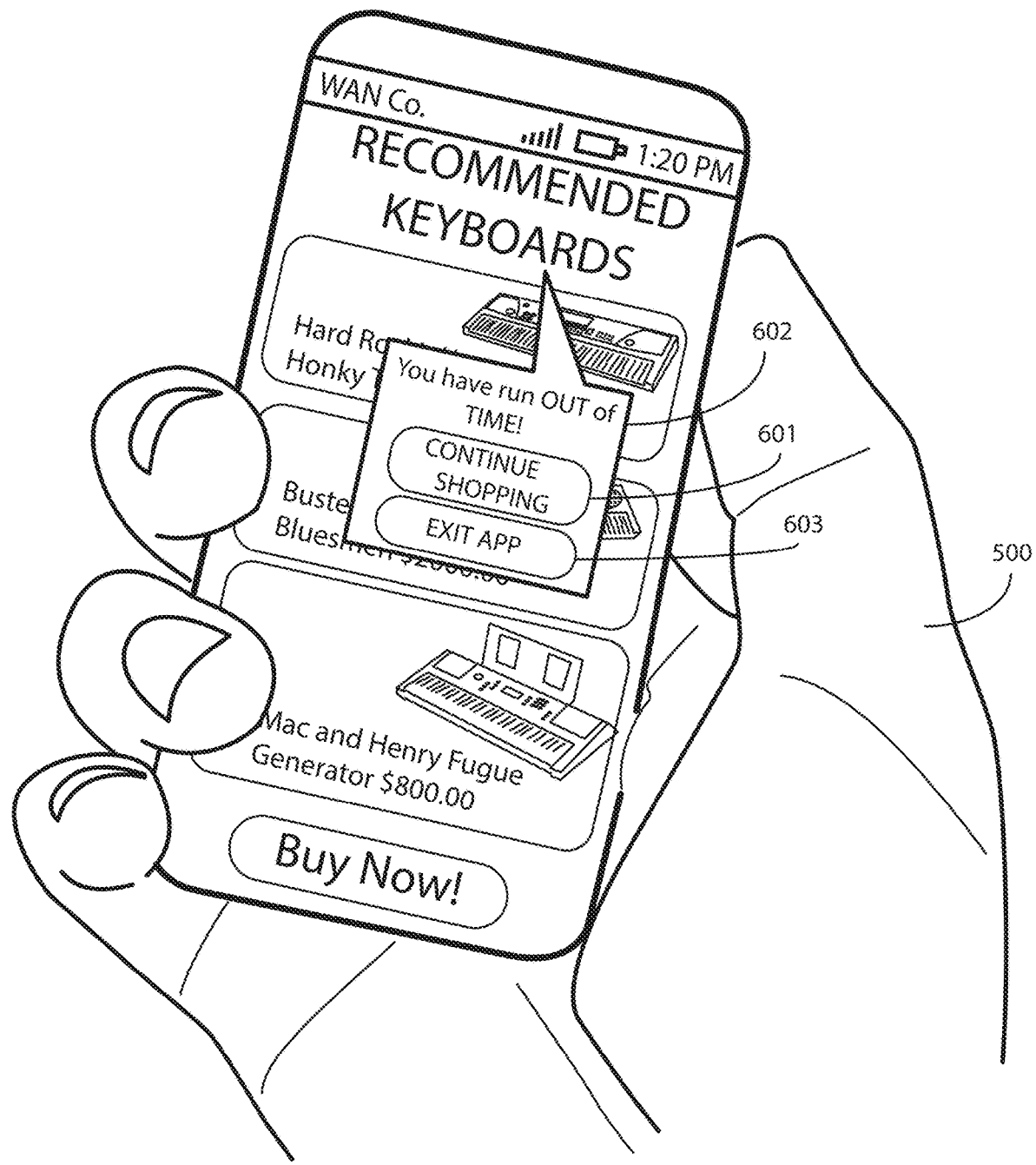
FIG. 6 illustrates another explanatory user interface presenting an electronic shopping interactive computing environment in accordance with one or more embodiments of the disclosure.

Turning now to FIG. 6, illustrated therein is another prompt 602 that is presented once the timer of FIG. 5 expires. This illustrative prompt 602 includes two user actuation targets 601,603. A first user actuation target 601 allows the user 500 to keep shopping despite the fact that the timer has expired. The second user actuation target 603 allows the user 500 to exit the electronic shopping interactive computing environment.

Figure 7:
FIG. 7 illustrates still another explanatory user interface presenting an electronic shopping interactive computing environment in accordance with one or more embodiments of the disclosure.

Turning now to FIG. 7, in this example the one or more processors of the electronic device 200 have accessed calendaring data in a calendaring application operating on one or more processors of the electronic device 200. Since the user 500 has a meeting in the next ten minutes and the average electronic shopping completion time is fifteen minutes, the one or more processors present a prompt 702 indicating that one or more processors upcoming appointments will occur within the average electronic shopping completion time. The prompt 702 also includes two user actuation targets 701,703. A first user actuation target 701 allows the user 500 to keep shopping and dismisses the prompt. By contrast, the second user actuation target 703 proposes the creation of a shopping appointment during which the calendaring application is devoid of upcoming appointments for the average electronic shopping completion time. When a user actuates this user actuation target 703, in one or more embodiments the one or more processors automatically select and propose such shopping appointments which the user 500 can select and enter into the calendar.

Figure 8:
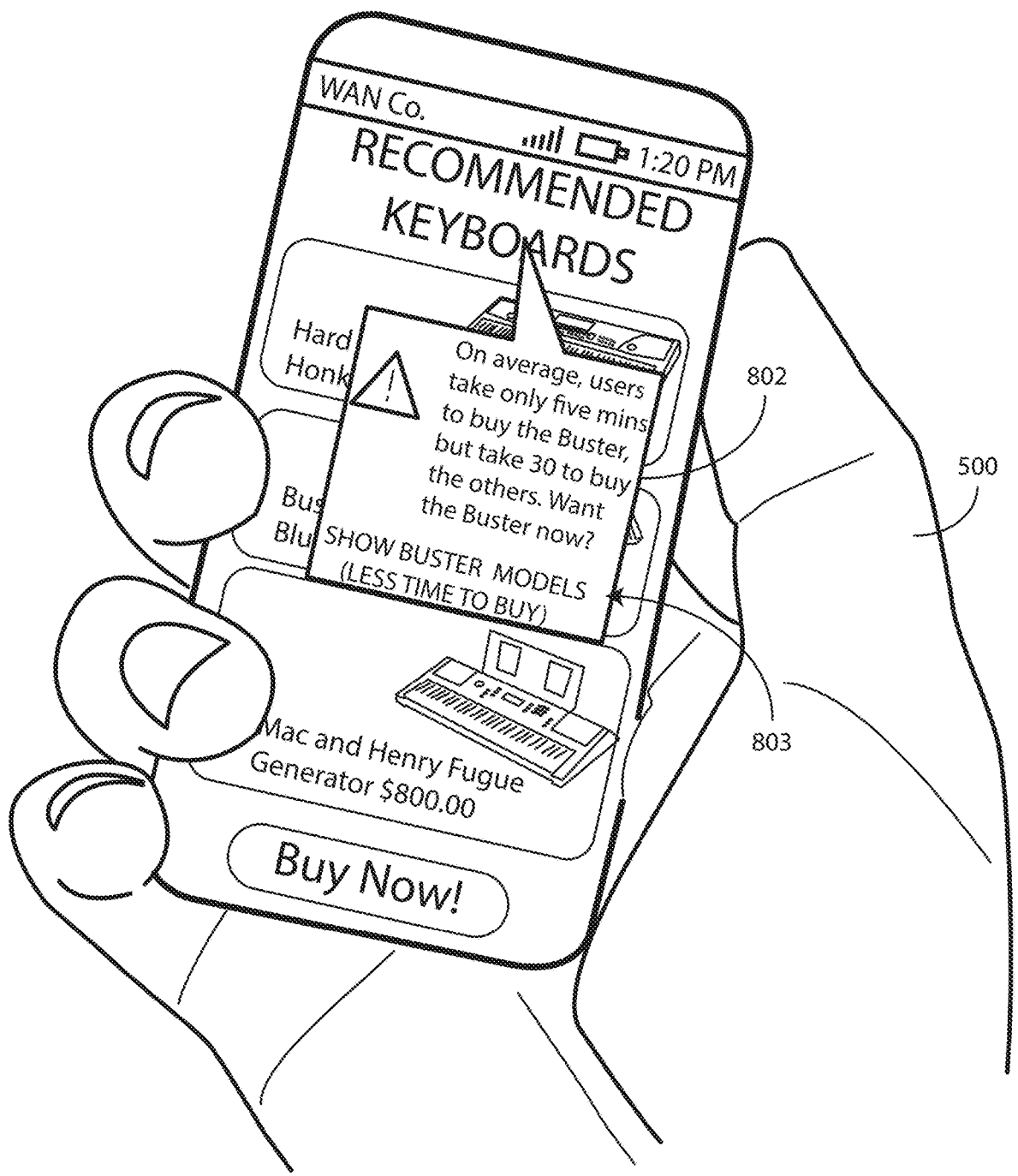
FIG. 8 illustrates yet another explanatory user interface presenting an electronic shopping interactive computing environment in accordance with one or more embodiments of the disclosure.

Turning now to FIG. 8, once again the user 500 has an upcoming appointment during the average electronic shopping completion time. Rather than proposing a shopping appointment, as was the case in FIG. 7, here the one or more processors present a prompt 802 that present options in response that have the shortest average electronic shopping completion time. As shown in this example, the prompt 802 notes that of the recommended options presented, it takes on average thirty minutes to buy brands other than the Buster, which takes only ten minutes. Accordingly, the prompt 802 has a user actuation target 803 that allows those products falling within a predefined average electronic shopping completion time to be presented.

Embodiments of the disclosure contemplate that the average electronic shopping completion time-based presentation of products can sometimes be a reflection of the quality of the product in that consumers often purchase name brand, highly rated products very quickly and directly. Accordingly, embodiments of the disclosure contemplate that the average electronic shopping completion time-based presentation of products can advantageously provide a maximum return on time invested.

Figure 9:
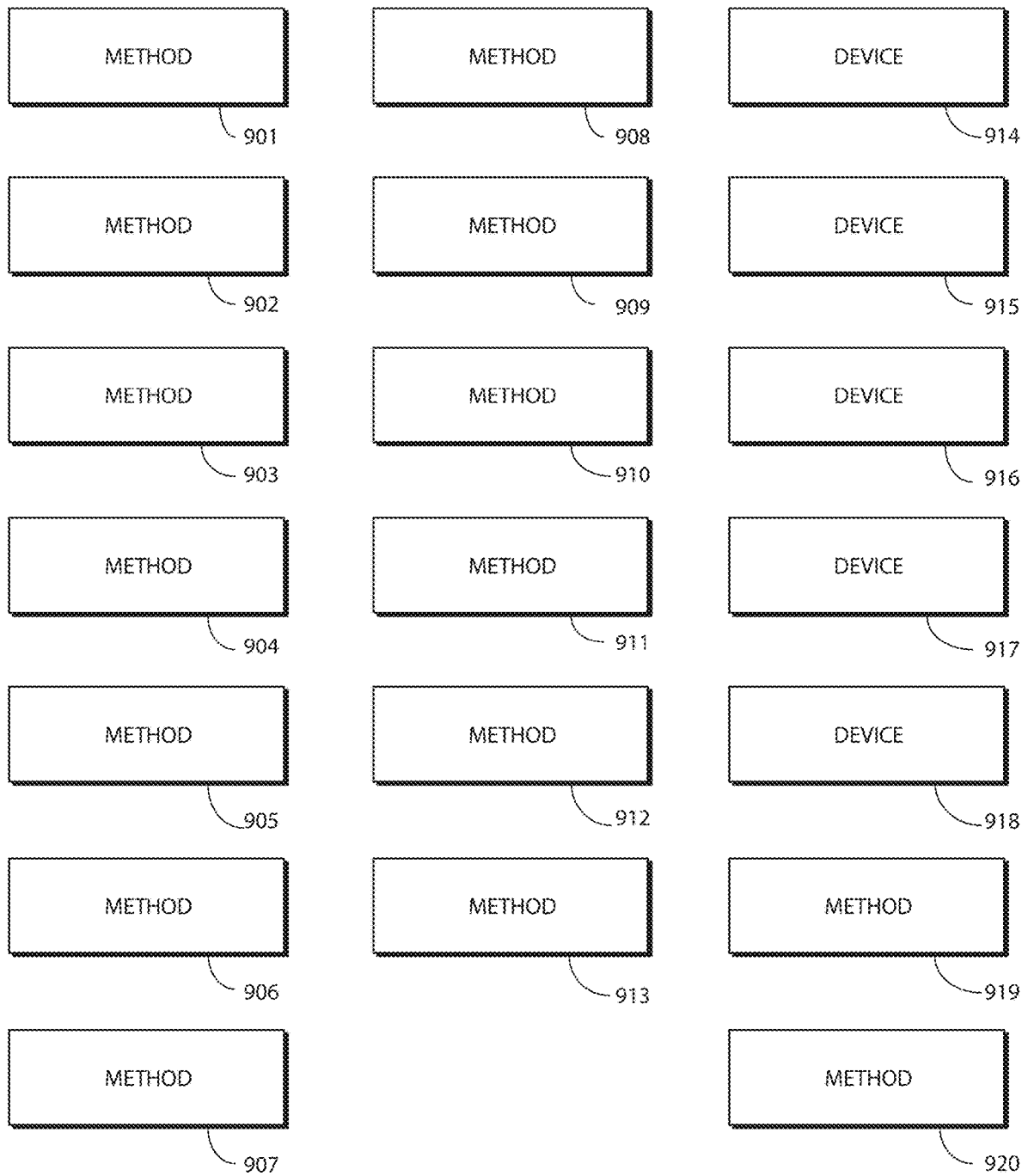
FIG. 9 illustrates one or more embodiments of the disclosure.

Turning now to FIG. 9, illustrated therein are various embodiments of the disclosure. The embodiments of FIG. 9 are shown as labeled boxes in FIG. 9 due to the fact that the individual components of these embodiments have been illustrated in detail in FIGS. 1-8, which precede FIG. 9. Accordingly, since these items have previously been illustrated and described their repeated illustration is no longer essential for a proper understanding of these embodiments. Thus, the embodiments are shown as labeled boxes.

At 901, a method in an electronic device comprises, in response to initiation of an interactive session in an electronic shopping interactive computing environment operating on one or more processors of the electronic device, detecting, by a user interface operable with the one or more processors, user input defining a search string having a category associated therewith. At 901, the method comprises retrieving, by the one or more processors in response to the user input, an average electronic shopping completion time associated with the category. At 901, the method comprises presenting, by the one or more processors on the user interface, a prompt identifying the average electronic shopping completion time associated with the category.

At 902, the prompt of 901 further comprises a user actuation target that, when actuated, causes the one or more processors to initiate a timer. At 903, actuation of the user actuation target of 902 causes the one or more processors to initiate the timer to count down the average electronic shopping completion time associated with the category.

At 904, the one or more processors of 903, upon expiration of the timer, present another prompt. At 905, the prompt of 904 comprises a timer restart user actuation target that, when actuated, restarts the timer.

At 906, the one or more processors of 904 remove the prompt from the user interface upon detecting an absence of user interaction with the prompt for a predefined duration. At 907, the other prompt of 904 comprises a schedule user actuation target that, when actuated, schedules resumption of the interactive session at a later time. At 908, the other prompt of 907 further comprises an exit user actuation target that, when actuated, terminates the interactive session.

At 909, the one or more processors of 903, upon expiration of the timer, reset the electronic shopping interactive computing environment. At 910, the one or more processors of 903, upon expiration of the timer, preclude access to the electronic shopping interactive computing environment for a predetermined amount of time.

At 911, the method of 901 further comprises retrieving, from a calendaring application operable on the one or more processors, one or more upcoming appointments occurring within the average electronic shopping completion time associated with the category. At 911, the prompt indicates that the one or more upcoming appointments will occur within the average electronic shopping completion time associated with the category.

At 912, the prompt of 911 comprises a conflict override user actuation target that, when actuated, dismisses the prompt. At 913, the method of 911 further comprises proposing, by the one or more processors in the prompt or another prompt, a shopping appointment during which the calendaring application is devoid of the upcoming appointments for the average electronic shopping completion time associated with the category.

At 914, an electronic device comprises a user interface, a memory, and one or more processors operable with the user interface and the memory. At 914, in response to the one or more processors detecting commencement of an interactive shopping session in an electronic shopping application operating on the one or more processors, the one or more processors retrieve an average electronic shopping completion time associated with a detected search string category and present a prompt identifying the average electronic shopping completion time associated with the detected search string category on the user interface.

At 915, the electronic device of 914 further comprises a communication device operable with the one or more processors. At 915, the one or more processors retrieve the average electronic shopping completion time associated with the detected search string category from a remote electronic device across a network using the communication device.

At 916, the electronic device of 914 further comprises a memory operable with the one or more processors. At 916, the one or more processors further access calendaring data associated a calendaring application stored in the memory to determine whether any upcoming appointments will occur during the average electronic shopping completion time associated with the search string detected category, and, where at least one upcoming appointment will occur during the average electronic shopping completion time associated with the detected search string category, cause the user interface to present a conflict prompt indicating that there is less than the average electronic shopping completion time associated with the detected search string category until the at least one upcoming appointment.

At 917, the one or more processors of 916 further access the calendaring data to identify a period spanning the average electronic shopping completion time associated with the detected search string category that is devoid of appointments and present a proposed scheduling prompt allowing the interactive shopping session to be added to the calendaring data as a new upcoming event. At 918, the prompt of 914 comprises a directional indicator identifying the detected search string category.

At 919, a method in an electronic device comprises retrieving, by one or more processors using a communication device, an average electronic shopping completion time associated with a detected category from an entered search string in response to initiation of an interactive session of an electronic shopping interactive computing environment operating on one or more processors of the electronic device. At 919, the method comprises presenting, by the one or more processors on a user interface, a prompt identifying the average electronic shopping completion time associated with the detected category. At 919, the prompt comprises a user actuation target allowing a timer to be initiated to count down the average electronic shopping completion time associated with the detected category.

At 920, the method of 919 further comprises accessing, by the one or more processors, calendaring data associated a calendaring application to determine whether any upcoming appointments will occur during the average electronic shopping completion time associated with the detected category. At 920, the prompt includes the user actuation target allowing the timer to be initiated only when the calendaring data fail to indicate the any upcoming appointments occurring during the average electronic shopping completion time associated with the detected category.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method for an electronic device, the method comprising:
   in response to initiation of an interactive session in an electronic shopping interactive computing environment operating on one or more processors of the electronic device, detecting, by a user interface operable with the one or more processors, user input defining a search string having a category associated therewith;

retrieving, by the one or more processors in response to the user input, an average electronic shopping completion time associated with the category; and presenting, by the one or more processors on the user interface, a prompt identifying the average electronic shopping completion time associated with the category.

2. The method of claim 1, wherein the prompt further comprises a user actuation target that, when actuated, causes the one or more processors to initiate a timer.

3. The method of claim 2, wherein actuation of the user actuation target causes the one or more processors to initiate the timer to count down the average electronic shopping completion time associated with the category.

4. The method of claim 3, wherein the one or more processors, upon expiration of the timer, present another prompt.

5. The method of claim 4, wherein the prompt comprises a timer restart user actuation target that, when actuated, restarts the timer.

6. The method of claim 4, wherein the one or more processors remove the prompt from the user interface upon detecting an absence of user interaction with the prompt for a predefined duration.

7. The method of claim 4, wherein the another prompt comprises a schedule user actuation target that, when actuated, schedules resumption of the interactive session at a later time.

8. The method of claim 7, wherein the another prompt further comprises an exit user actuation target that, when actuated, terminates the interactive session.

9. The method of claim 3, wherein the one or more processors, upon expiration of the timer, reset the electronic shopping interactive computing environment.

10. The method of claim 3, wherein the one or more processors, upon expiration of the timer, preclude access to the electronic shopping interactive computing environment for a predetermined amount of time.

11. The method of claim 1, further comprising:
retrieving, from a calendaring application operable on the one or more processors, one or more upcoming appointments occurring within the average electronic shopping completion time associated with the category;
wherein the prompt indicates that the one or more upcoming appointments will occur within the average electronic shopping completion time associated with the category.

12. The method of claim 11, wherein the prompt comprises a conflict override user actuation target that, when actuated, dismisses the prompt.

13. The method of claim 11, further comprising proposing, by the one or more processors in the prompt or another prompt, a shopping appointment during which the calendaring application is devoid of the upcoming appointments for the average electronic shopping completion time associated with the category.

14. An electronic device, comprising:
a user interface; and
one or more processors operable with the user interface;
wherein:
in response to the one or more processors detecting initiation of an interactive session in an electronic shopping interactive computing environment, the one or more processors retrieve an average electronic shopping completion time associated with a detected search string category and present a prompt identifying the average electronic shopping completion time associated with the detected search string category on the user interface.

15. The electronic device of claim 14, further comprising a communication device operable with the one or more processors, wherein the one or more processors retrieve the average electronic shopping completion time associated with the detected search string category from a remote electronic device across a network using the communication device.

16. The electronic device of claim 14, further comprising a memory operable with the one or more processors, wherein the one or more processors further access calendaring data associated a calendaring application stored in the memory to determine whether any upcoming appointments will occur during the average electronic shopping completion time associated with the detected search string detected category, and, where at least one upcoming appointment will occur during the average electronic shopping completion time associated with the detected search string category, cause the user interface to present a conflict prompt indicating that there is less than the average electronic shopping completion time associated with the detected search string category until the at least one upcoming appointment.

17. The electronic device of claim 16, wherein the one or more processors further access the calendaring data to identify a period spanning the average electronic shopping completion time associated with the detected search string category that is devoid of appointments and present a proposed scheduling prompt allowing the interactive shopping session to be added to the calendaring data as a new upcoming event.

18. The electronic device of claim 14, wherein the prompt comprises a directional indicator identifying the detected search string category.

19. A method in an electronic device, the method comprising:
retrieving, by one or more processors using a communication device, an average electronic shopping completion time associated with a detected category from an entered search string in response to initiation of an interactive session of an electronic shopping interactive computing environment operating on one or more processors of the electronic device; and
presenting, by the one or more processors on a user interface, a prompt identifying the average electronic shopping completion time associated with the detected category;
wherein the prompt comprises a user actuation target allowing a timer to be initiated to count down the average electronic shopping completion time associated with the detected category.

20. The method of claim 19, further comprising accessing, by the one or more processors, calendaring data associated a calendaring application to determine whether any upcoming appointments will occur during the average electronic shopping completion time associated with the detected category, wherein the prompt includes the user actuation target allowing the timer to be initiated only when the calendaring data fail to indicate the any upcoming appointments occurring during the average electronic shopping completion time associated with the detected category.

* * * * *